Patented Feb. 16, 1932

1,845,427

UNITED STATES PATENT OFFICE

IRVING F. LAUCKS AND GLENN DAVIDSON, OF SEATTLE, WASHINGTON, ASSIGNORS TO
I. F. LAUCKS, INCORPORATED, OF SEATTLE, WASHINGTON, A CORPORATION OF
WASHINGTON

GLUE AND METHOD OF MAKING

No Drawing. Original application filed October 29, 1923, Serial No. 671,381. Divided and this application filed October 4, 1928. Serial No. 310,430.

The art of making a water-proof glue from certain protein materials has been known for some time; thus casein and blood albumin are in common use. These last mentioned compounds, however, have a number of disadvantages from a practical standpoint. Casein is costly and lack of uniformity in the material as derived from various sources is a serious detriment; while blood albumin is not available except in certain situations. There is accordingly a great demand, particularly in the veneer industry where large quantities of glue are consumed, for a new glue that will be cheap and at the same time sufficiently waterproof.

By water-proof, in this connection, it is not meant that glues thus characterized will resist the action of water indefinitely, but it is meant that they are water-proof in the sense in which the term is used in the veneer industry, viz., that a panel can be soaked in cold water for from seventy-two to one hundred hours, or in boiling water for eight hours, without separation.

Vegetable compounds have not, so far as we are aware, been heretofore satisfactorily employed as a basis for water-proof glues of the type in question. It is true that some veneer makers, on account of the high price of casein, have come to use starch glues but these, at least as heretofore made, are not at all waterproof, and vegetable proteins have not heretofore been used at all, so far as we are aware.

We have now discovered, however, that by subjecting the same to proper treatment, such vegetable proteins or vegetable matter containing proteins in proper amount, can be converted into a water-proof glue that will satisfy the rigid requirements of veneer making. The requisite raw material may be derived from a number of sources and the treatment of such material is relatively simple and inexpensive so that as a result we are able to produce a satisfactory glue at a much lower cost than has heretofore been possible.

To the accomplishment of the foregoing and related ends, the invention, then, consists of the combination of ingredients or composition of matter and the steps involved in the preparation of such composition hereinafter fully described and particularly pointed out in the claims, it being understood that such disclosed ingredients and steps constitute but several of the various ways in which the principle of the invention may be used.

We have found that soya bean flour constitutes an admirable raw material for our purpose. Such flour is preferably made by grinding soya bean cake so that 80 per cent. will pass a 100 mesh screen and when treated with certain chemicals, or other substances, we make therefrom a very satisfactory glue that meets the requirements of the veneer trade fully and is in many respects better than the usual glues now on the market. Such bean cake, as analyzed by us, is found to contain on the average 45 per cent. protein, 12 per cent. water, 5 per cent. cellulose or crude fibre, 7 per cent. oil, 6 per cent. ash, and 25 per cent. carbohydrates.

We do not, however, wish to limit ourselves to soya bean flour or to vegetable protein derived from this source for we have made satisfactory glue by our improved process from a low grade wheat containing approximately 10 per cent. protein in amounts intermediate between the percentages thus noted as found in such soya bean flour and wheat.

Soya bean flour made from soya bean cake from which the oil has been expressed, is preferably used in practice because it is cheaper and makes a better glue, but flour made from whole soya beans, without expressing the contained oil, may also be used, although obviously this would not be economical in view of the value which attaches to such oil. As to the fineness of the flour, it is not necessary that the meal be ground as fine as indicated above, but fineness is desirable from a practical standpoint.

When the usual chemicals employed in making casein glue, viz., lime and sodium silicate, are added to a vegetable protein-containing material, for example, soya bean flour, a glue results, but it is not as good as casein glue. It is not as highly water resistant nor as workable. We find, however by the use of caustic soda with such vegetable protein-containing matter, a much better glue is obtained, such caustic soda apparently playing the part of dispersing the colloidal material. The resultant glue is then somewhat similar in its working properties to casein glue, although its water resistance is still slightly less.

Preferably we react on our vegetable protein-containing material with both caustic soda and lime. As equivalents of such caustic soda, caustic potash and ammonia may be used, although more expensive. Other equivalents of caustic soda are salts of soda (potash) with weak acids, e. g. sodium phosphate, sodium borate and the like, when lime is present. Similarly in place of lime, magnesia, baryta and strontia may be used as equivalents.

In order to improve the working properties, e. g. the spreading and flow, of the glue produced as aforesaid as well as the water resisting properties, we have found it desirable to add other substances of which the following are examples:—

Copper sulfate, cuprammonium compounds, copper-caustic soda compounds. Equivalents would be other alkaline compounds of copper.

Sodium dichromate. Equivalents would be other metallic dichromates or chromates.

Cresylic acid. Equivalents would be other phenols.

Sodium silicate, or other soluble silicates.

Rosin, sodium or calcium soaps of rosin. Equivalents would be other resins or resin combinations with metals.

The copper salts and dichromates make the glue more readily workable while at the same time imparting increased water resistance. The silicates and related compounds act as thinners while at the same time increasing the water resistance and the strength of the glue, rosin and derivatives thereof act as thinners and make the glue more readily workable. Cresylic acid increases the water resistance of the glue.

When we say that rosin and derivatives thereof "act as thinners and make the glue more readily workable", we means:—

Vegetable protein glues as a class tend to be of a consistency that may be called mushy. Such a consistency is typified by a suspension of a more or less insoluble material in water, for example a mixture of wood flour and water. A glue tending toward such a consistency is not a satisfactory glue because in the spreader, such a consistency is very difficult to spread uniformly both on the spreader rolls and on the veneer, even though such a glue might otherwise have excellent adhesive properties. Thus it is important to provide glue with proper consistency from the standpoint of its working properties. Such a consistency is more like a homogeneous fluid, even though viscous, than it is like a suspension. Glue of such consistency adheres readily to the spreader rolls to form a uniform film, and when a sheet of veneer is passed through the rolls, the glue leaves the rolls for the sheet of veneer in a uniform film, thus accomplishing a satisfactory spread of glue. Glues with consistency tending towards a homogeneous fluid are better mixed with water, because the fluid transmits the motion of the stirring arms through the mass, while with a glue of a mushy consistency the action of the stirring arms is localized to that portion of the mass in immediate contact or in the path of the arms. This is specially important with a glue which tends to lump in mixing with water, which is a common property of most glues. Transmission of stirring action is also important from the standpoint of proper dispersion as well as facilitating any reactions that are intended to take place.

As examples we may cite the following typical formulæ:—

(1) Mix dry 40 parts soya bean flour, 6 parts rosin, 8 parts Portland cement, 3 parts dichromate of soda and 5 parts caustic soda; add 140 parts water and 14 parts water glass; stir well; add 50 parts water.

(2) Mix 30 parts soya bean flour, 5 parts rosin, 1½ parts copper sulfate, ½ part sodium dichromate, 90 parts water, 1 part cresylic acid, 26 parts 18 per cent. caustic soda solution, 6 parts calcium hydrate in 15 parts water, 15 parts water glass.

The particular order in which the several ingredients are admixed together in the formulæ just given may be varied, and it is not necessary that the manufacture of the product be completed in a single continuous operation, but as a matter of practice we have found it desirable in certain cases to mix only certain of the ingredients initially and then add the others just before the glue is required for use. Thus, the glue that we are at present making commercially is made as follows, viz:—soya bean flour, lime, rosin and potassium dichromate are mixed dry, and in this form is shipped to the veneer plants. In the latter such dry product is then mixed with water, caustic soda solution and sodium silicate in the form of water glass, thereby making the finished glue. The proportions in which the foregoing ingredients are employed in the case of the particular method of manufacture just described will be substantially as given in the preceding formulæ number (1) and (2).

If the rosin is used much in excess of the proportions indicated in formula (2), which is seen to figure out approximately 17 per cent. on the basis of the vegetable protein flour, the good effects of rosin upon the consistency are largely nullified.

It will also be understood, of course, that the foregoing formulæ are typical and that many variations are actually made therein in the compounding of our improved glue.

It will be noted that sodium dichromate is used in conjunction with rosin. We have said that the dichromates make the glue more readily workable. This is largely because they diminish the foam. We believe that an oxidizing effect takes place on the rosin and possibly on the protein and other constituents of the vegetable seed flour when dichromates are embodied in the same formula and we have used other oxidizing agents such as permanganates, peroxides and even oxygen and air to produce this effect on the rosin and other constituents of the vegetable seed flour.

While it is not essential that oxidizing agents be used in conjunction with rosin, as a glue can be made using vegetable protein material and rosin without oxidizing agents, still a much more desirable glue from the standpoint of its working properties results when oxidizing agents are used in conjunction.

This application is a division of our application Serial No. 671,381, filed October 29, 1923 (Patent No. 1,689,732).

Other modes of applying the principle of our invention may be employed instead of the one explained, change being made as regards the process herein disclosed or the materials employed in carrying out such process provided the stated ingredients and steps or the equivalent of such stated ingredients or steps be employed.

We therefore particularly point out and distinctly claim as our invention:—

1. A glue composition, comprising the reaction products of protein and other constituents of ground oil seeds, rosin, and an alkaline hydroxide, in the presence of water.

2. A glue composition, comprising the reaction products of protein and other constituents of ground oil seeds, rosin, lime and sodium hydroxide, in the presence of water.

3. A glue composition, comprising the reaction products of protein and other constituents of ground oil seeds, rosin, an alkaline hydroxide, and an oxidizing agent, in the presence of water.

4. A glue composition, comprising the reaction products of protein and other constituents of ground oil seeds, rosin, an alkaline hydroxide, and a dichromate, in the presence of water.

5. A glue composition, comprising the reaction products of ground oil-seed cakes, rosin, and an alkaline hydroxide, in the presence of water.

6. A glue composition, comprising the reaction products of a soya bean protein containing material, rosin, and an alkaline hydroxide, in the presence of water.

7. A glue composition, comprising the reaction products of a soya bean protein containing material, rosin, lime and sodium hydroxide, in the presence of water.

8. A glue composition, comprising the reaction products of a soya bean protein containing material, rosin, an alkaline hydroxide, and an oxidizing agent, in the presence of water.

9. A glue composition, comprising the reaction products of a soya bean protein containing material, rosin, an alkaline hydroxide and a dichromate, in the presence of water.

10. A glue composition, comprising the reaction products of ground oil-seed cakes, not to exceed 17 per cent. of rosin, and an alkaline hydroxide, in the presence of water.

11. A glue composition, comprising the reaction products of ground oil-seed cakes, not to exceed 17 per cent. of rosin and about 12 to 16 parts caustic soda to 100 parts vegetable protein containing material, in the presence of water.

12. A glue composition, comprising the reaction products of a soya bean protein containing material, not to exceed 17 per cent. of rosin, and an alkaline hydroxide, in the presence of water.

13. A glue composition, comprising the reaction products of a soya bean protein containing material, not to exceed 17 per cent. of rosin and about 12 to 16 parts caustic soda to 100 parts vegetable protein containing material, in the presence of water.

IRVING F. LAUCKS.
GLENN DAVIDSON.